April 21, 1953     M. M. FITZGERALD     2,635,913
LITTER HOISTING SLING

Filed March 9, 1950     2 SHEETS—SHEET 1

INVENTOR
MARION M. FITZGERALD
BY
ATTORNEY

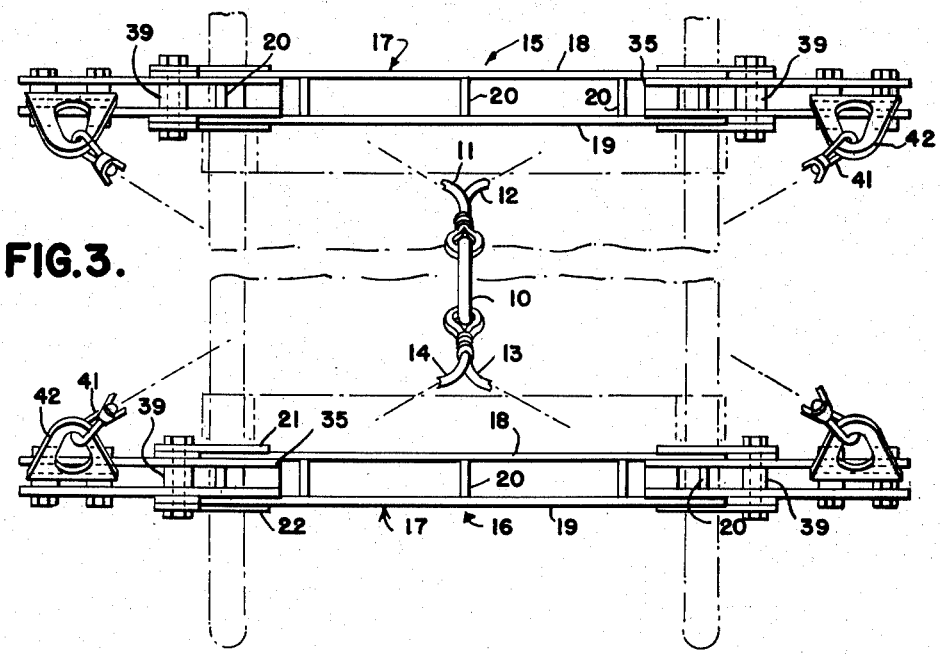
FIG. 3.
FIG. 4.
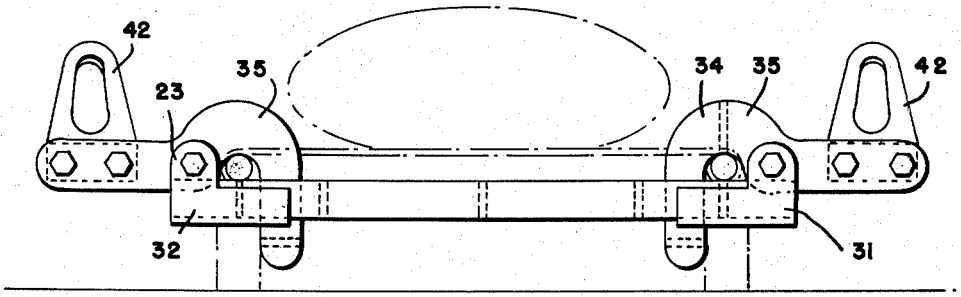
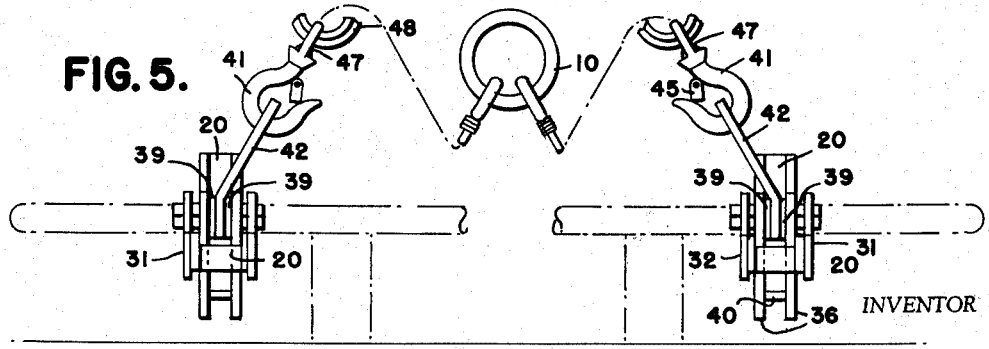
FIG. 5.
INVENTOR
MARION M. FITZGERALD
BY
ATTORNEY Patented Apr. 21, 1953

2,635,913

UNITED STATES PATENT OFFICE 2,635,913

LITTER HOISTING SLING

Marion M. Fitzgerald, Bandera, Tex.

Application March 9, 1950, Serial No. 148,679

4 Claims. (Cl. 294—74)

(Granted under Title 35, U. S. Code (1952), sec. 266)

The invention described herein may be manufactured and used by or for the Government of the United States of America for governmental purposes without the payment of any royalties thereon or therefor.

The use of litters is common practice for field use as in war time and particularly for transfer of casualties. The litter offers a problem in ship loading, and where the transfer is from a small boat to a ship at sea there is danger of injury to the litter occupant, when usual loading methods are employed. Commonly, a hoist is used with a sling consisting of an eye ring engageable with the hoist hook and four pendant cords with terminal rings adapted to slip over either the litter legs or the handle poles. This method is not satisfactory since litter legs are usually weakly attached and may yield under sudden tension. Also, where the rope rings are slipped over the pole ends, there is acute possibility of a ring slipping off in rough seas. Another sling method in use is known as a "salmon board" sling. This is a heavy wooden platform which is lowered over the ship's side to the delivery boat from which one to three litters are transferred and fastened to the salmon board floor and hoisted. In emergencies the litters may not be securely fastened and in rough weather the heavy platform in being lowered may cause injury to the litter or boat occupants.

A primary object of the present invention is to provide a litter hoisting sling which, when attached to a litter holds the litter fixedly irrespective of violent ship movement. A further object is to provide a litter sling which may be readily applied to, and removed from, the litter.

Other objects are to provide a litter sling which is inexpensive and of simple construction, which may be readily stored and packed, which is light in weight, which does not slip in use or readily tangle, and which does not jeopardize the litter occupant.

Other objects pertaining to the invention may be perceived on consideration of the following description of a preferred form of the sling in conjunction with the accompanying drawings in which Fig. 1 is a perspective view of one of the litter clamps showing connections to one of the sling ropes;

Fig. 3 is a top plan view of the sling in position over a litter to which it is attached;

Fig. 4 is an end view of a litter with the clamp spreader unit attached; and

Fig. 5 is a side elevation of the litter showing the sling in position to hoist.

Figure 1:
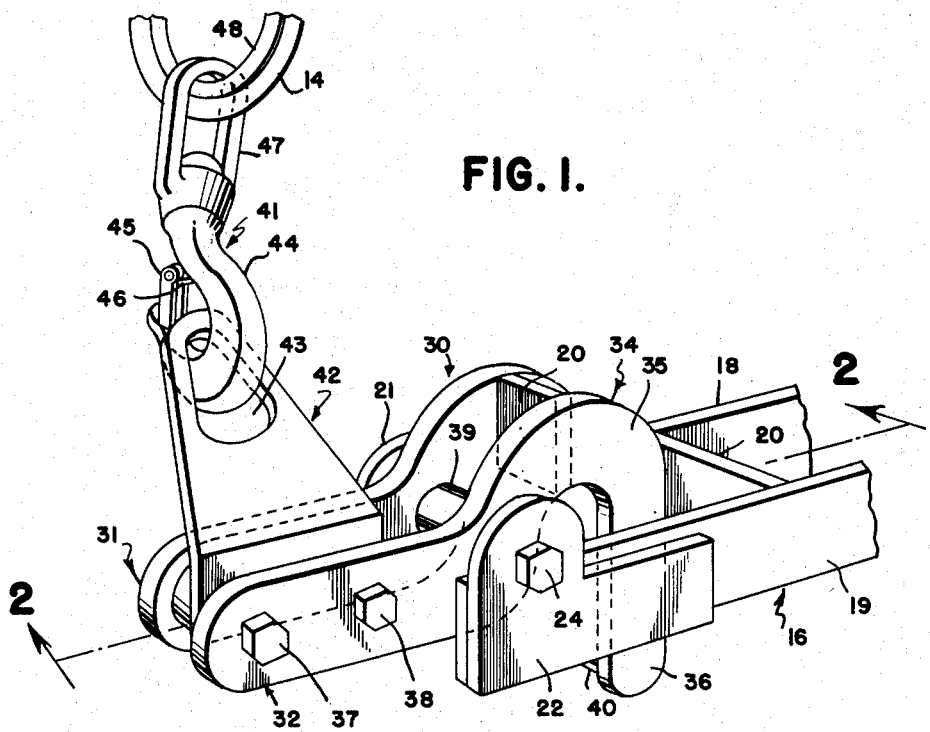

Fig. 3 is illustrative of the sling as attached to a litter, the sling including the eye ring 10, ropes or cables 11, 12, 13 and 14, which preferably are of wire, and spreader units 15 and 16 to which the ropes are attached. The ropes may be two flexible wire cables fastened to eye pieces at the center to form two pendants, the eye pieces being secured to the eye ring 10. The spreader units are identical in construction and hence only one need be described in detail. The unit includes a cross bar 17 in the form of parallel side plates 18 and 19 separated from each other by spacers 20; and on the outer side of each end of plates 18 and 19 are welded, or otherwise attached, pivot pin plates 21 and 22. These pin plates take the form of a rectangular strip with an edge near one end extended outwardly to form a pivot pin lug 23 in which an opening is made to receive the pivot pin 24.

The clamp 30 is mounted on the pivot pin 24. This clamp is formed of two parallel strips 31 and 32 having a straight section or shank 33 forming a lever arm, and a hook section 34 formed of an offset hook 35 opening transversely to the arm axis and terminating in a guard extension 36, the hook and guard being coplanar with the lever arm. These two strips are connected together by use of bolts 37 and 38 at the lever arm and by pivot pin 24, the bolts and pin carrying spacer tubes 39 to maintain the clamp plates in spaced relationship. Spacer plate 40 is also provided at the hook guard end. Preferably the pivot pin 24 is placed in the hook section just beyond the junction of the hook and the lever arm. It is apparent from the drawings that when assembled as above described the hook 35 forms a jaw adapted to engage an article, such as a pole, inserted in the bite of the hook. It is apparent also that if force be applied to the lever arm so as to cause the hook to move toward the bar, the pole will be gripped with considerable force.

Figure 2:
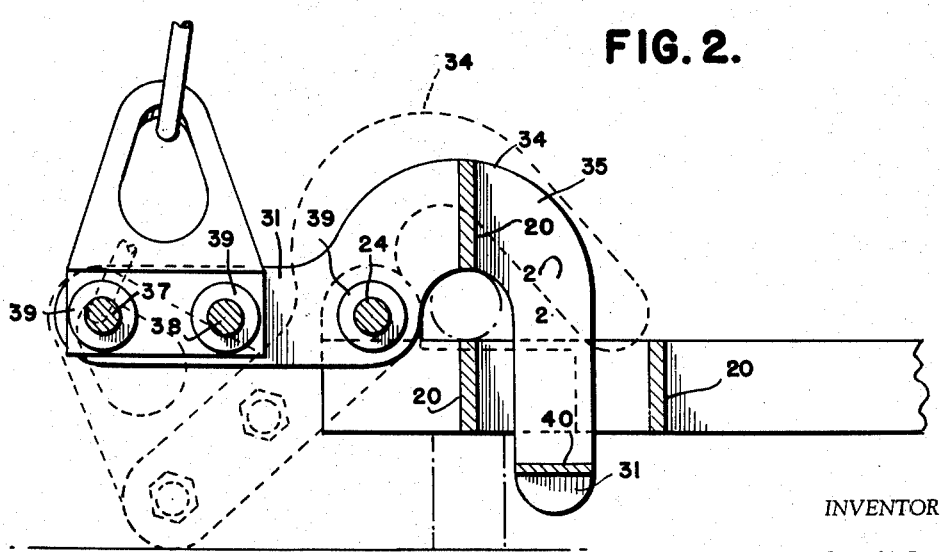
Fig. 2 is a section along line 2—2 of Fig. 1 showing the clamp in locked and unlocked position as regards a litter pole end.

In order to secure a flexible and easily adjustable connection between the clamp and rope, use is made of a swivel hook 41 and a special hook plate 42. The hook plate is roughly triangular in shape with one edge section having openings to receive lever arm bolts 37 and 38 which secure the plate fixedly to the lever arm between the strip 31 and the spacer tubes 39 mounted on bolts 37 and 38. The plate beyond the lever arm edge is bent at an angle to the clamp plane and an aperture 43 of approximately triangular shape, conforming to the plate edge contour, is formed therein. Because of this particular opening shape it is apparent that the lower portion of the opening (Figs. 1 and 2) permits ready hook insertion but when the hook is subjected to tension the hook enters the constricted top space where it is immobile. The angular bend in the plate serves to reduce the turning moment on the clamp since the rope pull is always at an angle to the litter ends.

The swivel hook 41 includes a hook 44 having a hook tip guard 45 held normally closed by spring 46 and a swivel collar and loop 47. Rope guide 48 and rope 14 are passed through the loop 47 and clasped to form a firm connection; also, the hook 44 is entered into the plate aperture 43 where it is retained by guard 45. Companion swivel hooks of identical construction are attached to each of the ropes pendant from the eye ring 10. Thus it may be seen as appears from Fig. 3 that when all ropes are attached to the swivel hooks and the swivel hooks connected with the swivel hook plates a suspension system is provided which is readily applicable to an article such as a litter having parts insertible in the jaws of the four clamps.

In use the sling clamps are fastened to the litter pole ends as indicated in Figs. 3 and 5 and the rope ring 10 placed on the hoist hook. As the hook lifts, the cables become taut and force the clamps to bite on the litter pole ends. The cross bars 17 spread the end clamps at a fixed transverse distance and the rigidity of the litter poles holds the clamps in axial displacement. After transport to the ship deck area or other desired location, the litter is lowered until it rests on the deck and the tension on the cables is relieved so that the clamps may then be slipped off the litter ends.

It is noted that the use of the spreaders 15 and 16 serves to separate the ropes in pairs so that the ropes do not readily tangle. The ropes are made sufficiently long (7 feet, for example) so as to insure adequate displacement between the hoist hook and litter at the moment when the litter is being attached in the small boat, thus avoiding injury to the litter occupant through wave motion. A single cable pendant may be inserted between the hoist ring 10 and the hoist hook, if desired, when relative motion between the ship and the attending boat is dangerously pronounced.

Modifications of the sling may be made to meet special conditions. For example, by simple change, the sling may be adapted to a six or other point suspension instead of the four point suspension as shown. Such changes are apparent to those skilled in the art and hence no restriction is intended by the disclosure as made other than may be required by the claims hereto appended.

What is claimed is:

1. A litter hoisting sling for transferring a pole extended litter from one point to another comprising a pair of litter supporting clamp separators, a straight shank clamp hook rotatably mounted on a pivot pin in each end of said pair of separators and adapted to engage the pole of said litter, a hoist ring, ropes connected to said ring extending therefrom to the end portions of the shank of said clamp hooks and hoisting means provided with a terminal hook connected to said hoist ring, whereby upon the application of a tensile stress to said ropes by said terminal hook and hoist ring said clamp hooks rotate about their pivot support in said separators and grip the poles of said litter against said separators.

2. The clamp separators as defined in claim 1 each comprising two parallel bars spaced from each other by normally positioned spacer elements securely attached to each bar, transversely aligned pin plates securely attached to the end portions of each bar and a pivot pin extending between and supported by each pair of pin plates.

3. The straight shank clamp hook as defined in claim 1 comprising two hook shaped plates arranged in parallel, each hook shaped plate having a straight shank section and a hook section formed of an offset hook opening transversely to the longitudinal axis through the shank section, said hook shaped plates secured to each other in spaced relationship by bolts extending through said shank sections and by said pivot pin and spaced from each other by spacer tubes on said bolts and pivot pin and an inwardly inclined, apertured hook plate mounted in said bolts between said hook shaped plates.

4. A litter hoisting sling for a pole extended litter comprising two pairs of grasping clamps, a pair of separators, means respectively mounting each of said clamps to the ends of said separators, a terminal hook connected to each of said clamps, a hoist ring, ropes connected at one end to said ring and at the other end to said hooks, whereby upon application of a tensile stress to said ropes by said terminal hook, said hoist ring causes said clamps to grasp the poles of said litter against said separators.

MARION M. FITZGERALD.

References Cited in the file of this patent

UNITED STATES PATENTS

| Number | Name | Date |
|---|---|---|
| 408,716 | Holton | Aug. 13, 1889 |
| 713,405 | Crawford | Nov. 11, 1902 |
| 1,918,007 | Woodruff | July 11, 1933 |

FOREIGN PATENTS

| Number | Country | Date |
|---|---|---|
| 318,504 | France | June 27, 1902 |